(No Model.)
H. C. CRAWFORD & E. V. MUNDY.
FRYING PAN AND BAKER.
No. 347,093. Patented Aug. 10, 1886.
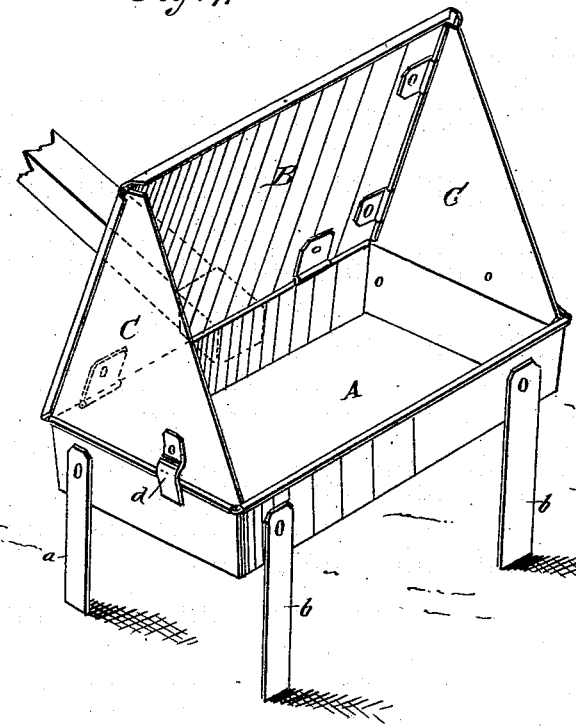
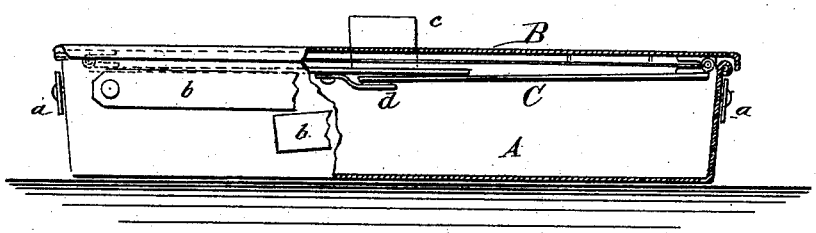
WITNESSES:
INVENTOR:
H. C. Crawford
E. V. Mundy
BY Munn & Co
ATTORNEYS.

UNITED STATES PATENT OFFICE.

HARRY C. CRAWFORD AND EDWIN V. MUNDY, OF DULUTH, MINNESOTA.

FRYING-PAN AND BAKER.

SPECIFICATION forming part of Letters Patent No. 347,093, dated August 10, 1886.

Application filed December 22, 1885. Serial No. 186,458. (No model.)

*To all whom it may concern:*

Be it known that we, HARRY C. CRAWFORD and EDWIN V. MUNDY, of Duluth, in the county of St. Louis and State of Minnesota, have invented a new and useful Improvement in Frying-Pans and Bakers, of which the following is a specification, reference being had to the annexed drawings, forming a part thereof, in which—

Figure 1 is a perspective view showing our improved device as arranged for baking. Fig. 2 is a side elevation, partly in section, showing our improved device arranged as a closed frying-pan or baker.

Similar letters of reference indicate corresponding parts in the different figures of the drawings.

The object of our invention is to provide a simple, inexpensive, and effective device for baking, roasting, or frying food before or in an open fire.

Our invention consists in the construction and arrangement of parts, as will be hereinafter fully described and claimed. The pan A is preferably made rectangular in form, and to opposite ends thereof are pivoted legs $a$, and to the front thereof are pivoted legs $b$, the said legs turning in planes parallel with the sides of the pan to which they are pivoted, so that they may be folded up at the side of the pan when not in use, as shown in Fig. 2, and unfolded to support the pan above a bed of coals, as shown in Fig. 1. To the back of the pan is secured a socket, $c$, for receiving a handle, and to the back side of the pan, at its upper edge, is hinged a cover, B, preferably made of bright tin. Near the ends of the cover, on its inner surface, are hinged triangular plates C, each provided with a clip, $d$, which engages the end of the pan A, and holds the plate C in position when unfolded, as shown in Fig. 1. The plates C are also made of bright tin, so that they assist the cover in reflecting the heat of the fire down upon the contents of the pan A. When the cover is opened, the plates C support the cover in an inclined position over the pan, and when the cover is to be closed the plates C are folded one over the other, and the clip $d$ of the inner plate is turned to engage the edge of the outer plate, so as to hold the plates in their folded position.

When the device is employed for baking before an open fire, the cover B is raised, and the end pieces are brought against the ends of the pan A, with the clips $d$ engaging the upper edges of the end of the pan, and the legs $a\ b$ are turned upon their pivots, as shown in Fig. 1.

When the device is employed for frying, it is closed, as shown in Fig. 2; and when arranged in this way it may be used for inclosing articles of food to be roasted in hot ashes. It will also be noticed that when the parts are folded, as in Fig. 2, the hinged pieces C will overlap and be held out of the food being cooked, by means of one of the clips $d$.

We are aware that a folding baker formed of a hinged top and bottom having triangular end pieces and pivoted legs is not new, the pan being separate from and supported within the baker by detachable rods; also, that a baker has been formed of a rectangular pan-supporting frame, having a hinged top and bottom provided at their ends with triangular side pieces, the bottom being provided with hinged legs, and we do not claim the same as of our invention; but we are not aware that a pan has ever been provided with a hinged cover having triangular end pieces provided with pivoted clips, one of which will hold the triangular end pieces folded against the cover when articles are to be baked.

Having thus described our invention, what we claim as new, and desire to secure by Letters Patent, is—

1. The pan having a hinged cover, triangular end pieces hinged to the ends of the cover, and a clip for securing the said end pieces, when folded, against the inner side of the cover, substantially as set forth.

2. The pan A, having a cover, B, hinged to its rear edge, the end pieces, C, hinged to the ends of the cover and overlapping at their free ends, when folded, and a pivoted clip, $d$, near the free end of one end piece at a point adjacent to that reached by the free end of the opposite end piece, when folded, whereby the clip may be turned to lock the two end pieces together against the under side of the cover, substantially as set forth.

HARRY C. CRAWFORD.
EDWIN V. MUNDY.

Witnesses:
T. H. HAWKES, Jr.,
JAMES N. NORTON.